United States Patent [19]

Katsumata et al.

[11] Patent Number: 5,006,043
[45] Date of Patent: Apr. 9, 1991

[54] FLOATING ANNULAR SEAL WITH THERMAL COMPENSATION

[75] Inventors: Shin Katsumata; Mark W. Corcoran, both of Rockford, Ill.

[73] Assignee: Sundstrand Corporation, Rockford, Ill.

[21] Appl. No.: 438,111

[22] Filed: Nov. 20, 1989

[51] Int. Cl.$^5$ .................. F04D 29/00; B65D 53/00
[52] U.S. Cl. .................. 415/113; 415/174.2; 415/174.4; 415/231; 277/183; 277/184; 277/222
[58] Field of Search .......... 415/170.1, 172.1, 173.1, 415/174.2, 174.3, 174.4, 229, 230, 231, 113; 277/227, 182, 183, 184, 222, 216, 165

[56] References Cited

U.S. PATENT DOCUMENTS

| | | | |
|---|---|---|---|
| 2,109,679 | 4/1936 | Neveling | 308/36.2 |
| 2,595,878 | 5/1952 | Parsons | 277/183 |
| 2,851,289 | 9/1958 | Pedersen | 286/7 |
| 3,373,999 | 3/1968 | Jepsen | 277/222 |
| 3,460,843 | 8/1969 | Jaeger | 277/26 |
| 3,510,230 | 5/1970 | Raub | 415/173 |
| 3,614,272 | 10/1971 | Lightfoot | 417/425 |
| 3,652,183 | 3/1972 | Pottharst | 415/170 |
| 3,752,598 | 8/1973 | Bowers et al. | 415/173 |
| 3,860,250 | 1/1975 | Lundquist | 277/165 |
| 3,936,590 | 2/1976 | Albano | 277/227 |
| 4,373,858 | 2/1983 | Eastman | 415/112 |
| 4,505,637 | 3/1985 | Raczynski | 415/112 |
| 4,543,038 | 9/1985 | Kitaguchi | 415/112 |
| 4,548,547 | 10/1988 | Deuring | 415/170 A |
| 4,575,306 | 3/1986 | Monnot | 415/131 |
| 4,579,352 | 4/1986 | Adang | 277/205 |
| 4,606,698 | 8/1986 | Clausen et al. | 415/170 A |
| 4,653,980 | 3/1987 | Wentworth | 415/173 R |
| 4,664,595 | 5/1987 | Tsuji et al. | 415/174.4 |
| 4,746,269 | 5/1988 | Kaab | 415/170.1 |

FOREIGN PATENT DOCUMENTS 583348 12/1946 United Kingdom ............... 277/182

*Primary Examiner*—Edward K. Look
*Assistant Examiner*—Hoang Nguyen
*Attorney, Agent, or Firm*—Antonelli, Terry, Stout & Kraus

[57] ABSTRACT

An aircraft fuel pump (1) is provided with a centrifugal impeller (2) and a stationary housing (3). A floating annular seal (4) mates with both the stationary housing and the rotating impeller thus providing sealing on two surfaces. The annular seal (4) comprises, in combination, a sealing material (5) positioned radially opposite the surface (6) of the impeller to be sealed, a backing ring (7) radially spaced from the sealing material for axially sealing against a surface (13) on a mating ring (15) of the stationary housing (3), and an elastomer (8) which is bonded to both the sealing material and the backing ring. The sealing material (5) is in the form of sealing material segments (9, 10, 11) which are arranged end to end with expansison grooves (12) remaining between the opposed ends for accommodating differences in thermal expansion between the impeller and the sealing material. The expansion grooves are in the form of a spiral to create a pumping action with relative rotation between the impeller and the sealing material to resist leakage of fuel through the expansion grooves.

19 Claims, 2 Drawing Sheets

FLOATING ANNULAR SEAL WITH THERMAL COMPENSATION

TECHNICAL FIELD

The present invention relates to an improved annular seal for forming a seal with a radially opposed surface and, more particularly, to an annular seal and a method of compensating for a difference in thermal expansion between a rotary member adapted to rotate about an axis and the adjacent sealing material of the annular seal which encircles the rotary member with clearance and forms a fluid seal with a radially opposed surface of the rotary member. In a disclosed embodiment a pump employs the annular seal which provides sealing on two surfaces, namely against a stationary mating ring mounted in a housing and a rotating centrifugal impeller of the pump.

BACKGROUND ART

Annular seals in pumps such as liquid fuel pumps necessarily operate in a changing and severe environment. The operating parameters include small running clearances, wide temperature ranges, high surface velocities, extreme hydraulic axial loads due to high pressure differentials and the presence of contaminants such as sand and iron oxide in the fuel which degrade the integrity of the seal faces by erosion. In order for a seal to survive such a rugged environment, the seal material must have characteristics of high hardness, low coefficient of friction, and high thermal conductivity. Most materials that have been determined to satisfy these requirements have an inherent high modulus of elasticity and a low thermal expansion. In order to maintain a constant running clearance between the annular seal and rotating centrifugal impeller of the pump throughout the entire operating range of the pump, the difference in thermal expansion of the seal and impeller must be compensated for.

Examples of prior art which deal with the problem of providing a seal for the gap between two parts which may rotate relative to one another are shown in U.S. Pat. Nos. 2,851,289; 3,460,843; 4,575,306; 4,579,352; and 4,653,980.

SUMMARY OF THE INVENTION

An object of the invention is to provide an improved floating annular seal with thermal compensation which overcomes the aforementioned problems.

More specifically, an object of the present invention is to provide an improved annular seal and method for forming a seal with a radially opposed surface which compensate for a difference in thermal expansion between the surface and the annular seal over a wide temperature range while maintaining a constant running clearance between the seal and the surface.

A further object of the invention is to provide an improved pump comprising a rotating centrifugal impeller which is rotatable about an axis, a stationary housing surrounding at least a portion of the impeller with clearance and a floating annular seal located intermediate the impeller and the housing for sealing against both a first surface of the impeller and a second surface of the housing under conditions of wide temperature changes, high surface velocities, extreme hydraulic axial loads due to high pressure differentials across the seal, and where the annular seal resists erosion of the seal faces from the presence of contaminants in the liquid being pumped.

These and other objects are attained by the improved annular seal of the invention for forming a seal with a radially opposed surface. The annular seal comprises, in combination, a sealing material adapted to be positioned radially opposite a surface to be sealed, a backing ring radially spaced from the sealing material and elastomeric means interconnecting the sealing material and the backing ring. The backing ring compensates for the difference in thermal expansion of the sealing material and the radially opposed first surface and also provides support to the hard, generally brittle, sealing material, e.g. a ceramic material The elastomeric means intermediate the sealing material and the backing ring interconnects the sealing material and the backing ring and provides an expansion joint for thermal expansion/contraction differences.

The surface of the sealing material adapted to be radially opposite the surface to be sealed comprises at least one expansion groove which extends from one side of the sealing material to the other for eliminating excessive hoop stress in the sealing material. In a preferred embodiment of the invention, the at least one expansion groove is in the form of a spiral whereby a pumping action can be induced by relative rotation between the sealing material and the surface to be sealed. The pumping action resists leakage of fluid through the expansion grooves from the pressure differential across the annular seal.

In the preferred embodiment of the invention, the sealing material is in the form of a plurality of segments of sealing material in the of a ring. Opposed edges of adjacent segments are spaced from one another to define a plurality of expansion grooves which extend from one side of the sealing material to the other. In another embodiment the segments of sealing material could be staggered segments with expansion grooves between opposed edges of adjacent segments. The expansion grooves are each in the form of a spiral for producing a pumping action to resist leakage of pressurized fluid across the seal through the expansion groove. The elastomeric means interconnecting the sealing material and the backing ring in the preferred form of the invention is an elastomer. The sealing material and backing ring are each bonded to respective sides of the elastomer. The annular seal in the preferred form of the invention is a floating seal which forms a seal with respective surfaces of two components. For example it can be used to form a seal in a pump between a housing and a rotating centrifugal impeller of the pump. The backing ring is formed with an end surface which makes an axial face seal with an axially opposed surface of the mating ring as a result of the fluid pressure differential across the floating annular seal during operation of the pump. The end surface of the backing ring is in the form of axially supporting the sealing material and the intermediate elastomeric means.

Accordingly, it can be seen that the method of the invention for compensating for a difference in thermal expansion between a rotary member adapted to rotate about an axis of rotation and an adjacent sealing material of an annular seal which encircles the rotary member with clearance and forms a fluid seal with a radially opposed surface of the rotary member comprises the steps of providing the sealing material in a discontinuous annular form having at least one expansion groove extending from one side of the sealing material to the other and mounting the sealing material on a backing ring of a material whose thermal expansion is closer to that of the rotary member than that of the sealing member via an intermediate elastomeric material. The sealing material is provided in the form a plurality of segments which are mounted end to end with clearance on the backing ring via the intermediate elastomeric material to form expansion grooves. The expansion grooves are in the form of spiral grooves for creating a pumping action to resist fluid leakage through the grooves with relative rotation of the rotary member and the annular seal.

The pump of the invention comprises a rotating centrifugal impeller which is rotatable about an axis, a stationary housing surrounded at least a portion of the impeller with clearance and a floating annular seal located intermediate the impeller and the housing for sealing against both a first surface of the impeller and a second surface of the housing. The annular seal includes a sealing material portion radially opposite the first surface of the impeller for forming a seal therewith, a backing ring located radially outwardly from the sealing material. The backing ring has an end surface for forming an axially face seal with the second surface of the housing which is axially opposed to the end surface of the backing ring. An elastomer is arranged between the sealing material and the backing ring and interconnecting the sealing material on the backing ring. The sealing material comprises a plurality of segments of sealing material having opposed edges which define expansion grooves for eliminating hoop stress in the sealing material. The expansion grooves spiral in the axial direction so that a pumping action is created by the relative rotation between the impeller and the annular seal to resist leakage of fluid through the expansion grooves. The second surface of the housing is defined by a radially inwardly extending portion of a mating ring of the housing in the illustrated embodiment. These and other objects, features and advantages of the invention will become more apparent from the following description when taken in connection with the accompanying drawings, which show, for purposes of illustration only, one embodiment in accordance with the present invention.

DETAILED DESCRIPTION OF PREFERRED EMBODIMENT

Figure 1:
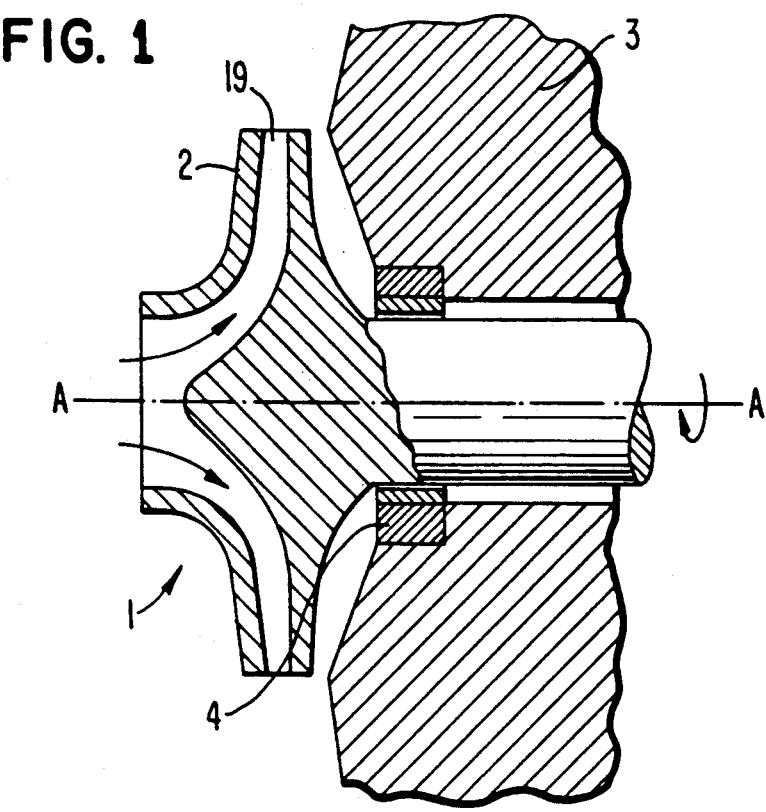
FIG. 1 is a cross-sectional view, taken along the axis of rotation, of a pertinent portion of a pump according to the invention and illustrating the floating annular seal with thermal compensation according to a preferred form of the invention.

Referring now to the drawings, of the invention, which may be a fuel pump, for example, is shown in pertinent portion in FIG. 1. The pump comprises a rotating centrifugal impeller 2 which is rotatable about an axis A—A through suitable gearing, not shown, by a suitable source of motive power such as a gas turbine engine, also not shown. The impeller 2 is supported for rotation about the axis A—A by bearings, not shown. The impeller 2 rotates with clearance within a stationary housing 3 of the pump. A floating annular seal 4 of the invention is located intermediate the impeller 2 and the stationary housing 3 in the pump for sealing the gap between the rotating impeller and the housing against excessive leakage flow of the liquid being pumped past the seal 4 from the high pressure side of the seal adjacent impeller outlet 19 to an opposite, low pressure side of the seal.

Figure 2:
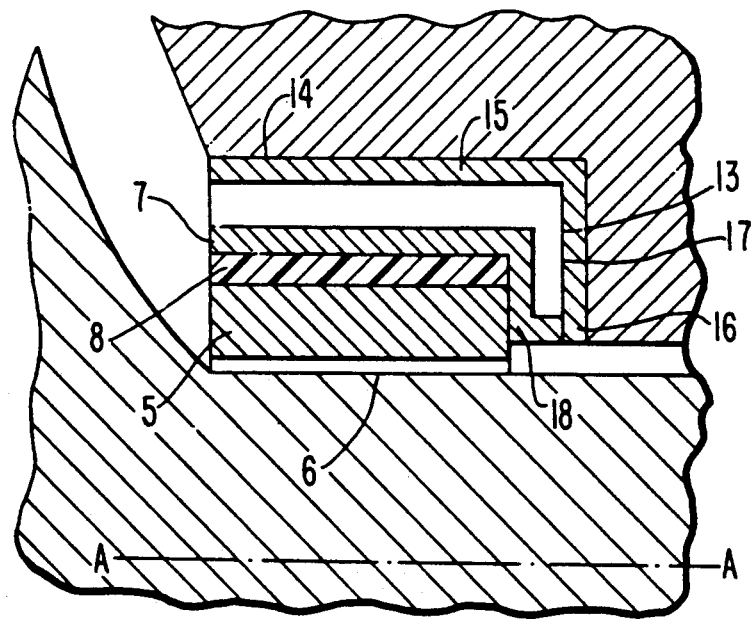
FIG. 2 is an enlarged cross-sectional view of the annular seal of FIG. 1.

The construction of the floating annular seal 4 is shown in more detail in the enlarged cross sectional view of the seal in FIG. 2. As seen therein, the annular seal 4 comprises, in combination, a sealing material 5 which is positioned radially opposite a surface 6 of the impeller 2 to be sealed, a backing ring 7 which is spaced radially outward from the sealing material 5 and an elastomeric member 8 bonded to both the ring 7 and sealing material 5 to interconnect the sealing material 5 and backing ring 7.

The sealing material 5 is a material having a high hardness, a low coefficient of friction, and a high thermal conductivity in order to withstand the rugged environment in the pump. In the disclosed embodiment the sealing material is a ceramic material, such as a composite of silicon carbide and graphite. One commercially available ceramic of this kind is that from Pure Carbon Inc. under the designation PG9723.

Figure 4:
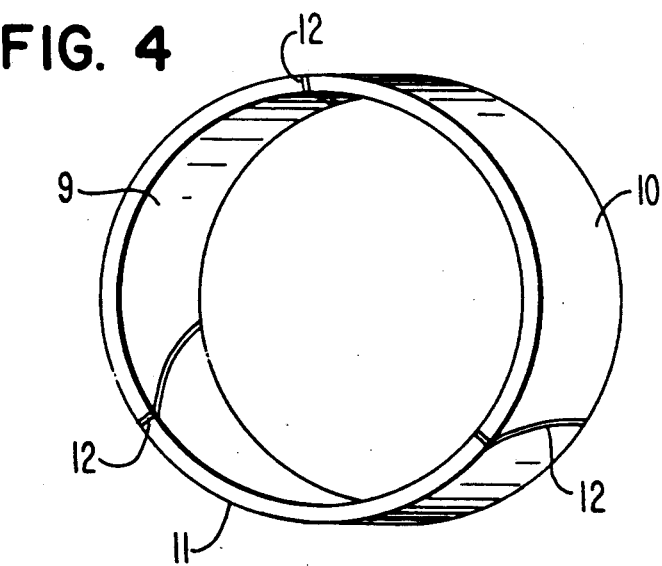
FIG. 4 is a schematic illustration of the sealing material of the annular seal formed by three arcuate segments of sealing material arranged end to end in the form of a ring with clearance at their respective, opposed ends to form spiral expansion grooves there between as in the annular seal of FIGS. 1-3.

The seal material is segmented to allow the seal material to self adjust in the radial direction by way of the elastomeric member 8 to eliminate hoop stress in the seal material which would otherwise occur if a continuous seal material ring were interference fit within a backing ring without the use of an elastomeric member for matching the thermal expansion of the annular seal and the impeller. The elastomeric member also serves to control the damping and stiffness characteristics of the seal thus improving rotodynamics. Illustratively, in FIG. 4 the sealing material 5 is formed of a plurality of arcuate segments 9, 10 and 11 of sealing material. Each sealing material segment traverses an arcuate segment of approximately 120 degrees about a radius of curvature corresponding to that of the interior surface of the annular seal 4.

The inside diameter of the sealing material 5 of the annular seal 4 is slightly larger than the outside diameter of the first surface 6 of the impeller 2, such that approximate clearance of one thousandth of diameter exists about the surface 6 between the sealing material 5 of the annular seal 4 of the impeller, For example, the outside diameter of the first surface 6 of the impeller 2 may be 2 ½ inches and the inside diameter of the sealing material 5 of the annular seal is slightly larger such that a clearance of 0.002 inch exists about the surface 6 between the sealing material 5 of the annular seal and the impeller. The thickness of the segments 8, 9 and 10 as seen in the cross section of FIG. 2 is within the range of 0.020–0.100 inch, for example, and the length of the seal material as shown in cross-section, which corresponds to the width of the annular seal 4, is 0.400-0.500 inch. Of course, the sizes and dimensions of the impeller and seal could be other than those given in this example as will be readily apparent to the skilled artisan.

The impeller 2 is formed of titanium and has a coefficient of thermal expansion which is such greater than that of the ceramic sealing material 5 of the annular seal 4. The difference in thermal expansion of the impeller and the sealing material is compensated by the use of the backing ring 7 which is formed of a material whose thermal coefficient of expansion is closer to that of the impeller. In the disclosed embodiment the backing ring is formed of the same material as the impeller, e.g. titanium. The thickness of the backing ring is approximately 0.100 inch, for example, and the length thereof as seen in the cross-section of FIG. 2, which corresponds to the width of the annular seal 4, is on the order of the width of the sealing material 5 except that it includes an axially projecting nose 17 on one end thereof as discussed in more detail below.

As discussed above, to avoid the problem of excessive hoop stress in the sealing material 5, the sealing material is discontinuous such that it is formed with at least one expansion groove therein and, in addition, the sealing material is connected to the backing ring 7 by way of the elastomeric member 8. The elastomeric member 8 is preferably formed of an elastomer, e.g. a fluoroelastomer based on the copolymer of vinylidine fluoride and hexafluoropropylene, such as Viton. The thickness of the elastomeric member in the illustrated embodiment is 0.010-0.100 inch depending on the material damping and stiffness requirements. The width of the elastomer as shown in cross-section corresponds to that of the sealing material 5. It is also envisioned that the intermediate material 8 of the seal need not be an elastomer but could be formed of another material such as glass, which also permits matching of the thermal expansion of the annular seal and the impeller.

Figure 3:
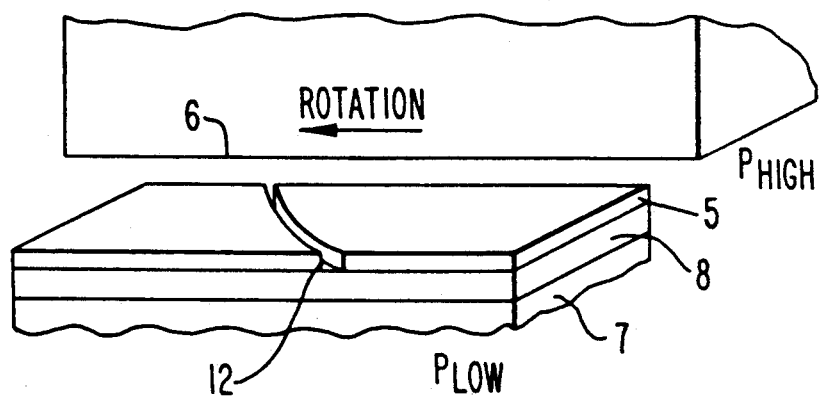
FIG. 3 is an enlarged view of a portion of the outer surface of the floating annular seal of FIGS. 1 and 2 depicting a spiral groove between the opposed ends of two segments of sealing material.

The elastomer or other intermediate material 8 is bonded directly to the backing ring 7 and the sealing material segments 9, 10 and 11 as with an adhesive such that the clearances between the opposed ends of the sealing material segments 9, 10 and 11 constitute expansion grooves 12 which permit the required thermal expansion of the annular seal with an increase in temperature for maintaining a constant clearance between the first surface 6 of the impeller 2 and the radially opposed surface of the sealing material 5. Each of the expansion grooves 12 between the respective segments of the sealing material is preferably in the form of a spiral as shown in FIG. 3 whereby a pumping action can be induced by relative rotation between the sealing material and the first surface 6 of the impeller to be sealed. The grooves 12 have a width of 0.001-0.005 inch at room temperature, for example. The pumping action resists leakage of the liquid being pumped, e.g. fuel, through the expansion grooves 12 from the high pressure differential across the annular seal 4. These pressure differentials may be as high as 800-1000 psi.

Figure 5:
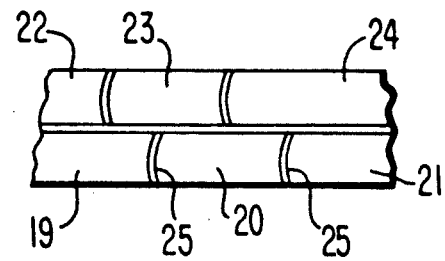
FIG. 5 is an enlarged view of a portion of the outer surface of another form of the floating annular seal exhibiting a staggered set of grooves.

The annular seal 4 is free to float between the first surface 6 of the impeller 2 and the surrounding stationary housing 3 of the pump. To resist axial displacement of the annular seal 4 from the high pressure differentials across the seal and also to effectively seal the housing 3 and annular seal 4, the backing ring 7 has an axial face which rides against a second surface 13 of the housing 3 to provide a seal against fuel leakage Specifically, the housing 3 if formed with a circular opening 14. The housing 3 is aluminum in the disclosed embodiment but other materials could be employed. A mating ring 15 which, illustratively, could be solid silicon carbide or M2 tool steel inserted into the opening 214 of the housing 3. The second surface 13 of the housing is formed on a radially inwardly extending portion 16 of the mating ring 15. An axial end surface of the backing ring 7 rides against the surface 13 of the portion 16 of the mating ring 15. In the illustrated embodiment, this axial end surface of the backing ring 7 is if formed on an axially projecting nose 17 of the backing ring. The radially opposed surfaces of the mating ring 15 and the backing ring 7 as shown in FIG. 2 are spaced from one another to permit the necessary expansion and nutation of the annular seal 4 without restraint. The backing ring 7 is also formed with a radially inwardly extending lip 18 adjacent the nose 17. The lip 18 advantageously provides support for the elastomer 8 and seal segments 9, 10 and 11 to prevent elastomer creep and to limit seal segment movement in the axial direction against the high pressure loading. During operation of the pump 1, the floating annular seal 4 undergoes nutation motion. The form of the invention shown in FIG. 5 has a sealing material 5 formed of a plurality of segments, e.g. 19-24, which are arranged to form staggered sets of expansion grooves 25 in the shape of a spiral.

From the above, it can be seen that the method of the invention compensating for a difference in thermal expansion between a rotary member adapted to be rotated about an axis of rotation and the adjacent sealing material of an annular seal which encircles the rotary member with clearance and forms a fluid seal with as radially opposed surface of the rotary member, comprises the steps of providing the sealing material in a discontinuous annular form having at least one expansion groove extending from one side of the sealing material to the other and mounting the sealing material on a backing ring of a material whose thermal expansion coefficient is closer to that of the rotary member than that of the sealing material via an intermediate elastomeric material. The at least one expansion groove is preferably in the form of a spiral for creating a pumping action to resist fluid leakage through the at least one expansion groove with relative rotation of the rotary member and the annular seal. In the disclosed embodiment, the sealing material is provided in the form of plurality of segments which are mounted end to end with clearance on the backing ring via the intermediate elastomeric material to form the expansion grooves.

While we have illustrated and described only one embodiment in accordance with the present invention, it is understood that the invention is not limited thereto but us susceptible to numerous changes and modification as known to those skilled in the art. Thus, for example, the particular dimension and specific materials of the annular seal and pump disclosed herein, are not limiting Other sizes and materials could be employed. The seal could also be used in geometric arrangements different from that disclosed in the illustrated embodiment. Further, by varying the elastomer stiffness and damping properties, the characteristic of the dynamics of the seal can be altered. Also, the annular seal of the invention has applicability apart from the particular pump disclosed herein. The annular seal could be used in other apparatus such as a turbine for sealing between first and second members where there is relative rotation between the members. The disclosed pump could also be used for pumping liquids other than fuel. Therefore, we do not wish to be limited to the details shown and described herein, but intend to cover all such changes and modifications as are encompassed by the scope of the appended claims.

We claim:

1. A floating annular seal for forming a seal with a radially opposed first surface, comprising, in combination, a sealing material adapted to be positioned with clearance radially opposite a first surface to be sealed, a backing ring radially spaced from said sealing material, and elastomeric means interconnecting said sealing material and said backing ring, wherein the surface of said sealing material adapted to be positioned with clearance radially opposite the first surface to be sealed comprises at least one open expansion groove for eliminating excessive hoop stress in the sealing material, and wherein said at least one open expansion groove is in the form of a spiral whereby a pumping action can be induced by relative rotation between the sealing material and the first surface to be sealed.

2. An annular seal according to claim 1, wherein the sealing material comprises a plurality of expansion grooves which extend from one side of the sealing material to the other.

3. An annular seal according to claim 1, wherein said sealing material comprises a plurality of segments of sealing material having spaced opposed edges which define a plurality of open expansion grooves.

4. An annular seal according to claim 3, wherein the segments of sealing material are arranged in staggered sets to form staggered expansion grooves.

5. An annular seal according to claim 1, wherein said means interconnecting said backing ring and said sealing material comprises an elastomer.

6. An annular seal according to claim 5, wherein said backing ring and sealing material are both bonded to said elastomer.

7. An annular seal according to claim 1, wherein said annular seal is a floating seal with the backing ring thereof having an end surface adapted to form an axial face seal with an axially opposed second surface.

8. An annular seal according to claim 7, wherein said axially opposed second surface is a radially inwardly extending surface of a surrounding mating ring mounted on an adjacent structure.

9. An annular seal according to claim 1, wherein said sealing material is a ceramic material.

10. An annular seal according to claim 1, wherein said backing ring has a radially extending lip for axially supporting said sealing material and said elastomeric means.

11. An annular seal according to claim 1, wherein said radially opposed first surface is a surface of an impeller of a pump.

12. A pump comprising a rotating centrifugal impeller which is rotatable about an axis, a stationary housing surrounding at least a portion of the impeller with clearance and a floating annular seal located intermediate the impeller and housing for sealing against both a first surface of said impeller and second surface of said housing, said annular seal including a sealing material positioned radially opposite said first surface of the impeller with clearance for forming a seal therewith, a backing ring located radially outwardly from the sealing material, said backing ring having an end surface for forming an axial face seal with said second surface of the housing which is axially opposed to said end surface of the backing ring and an elastomer arranged between the sealing material and the backing ring and interconnecting said sealing material and said backing ring, and wherein said sealing material comprises a plurality of segments of sealing material having opposed edges which define open expansion grooves between the opposed edges for eliminating hoop stress in the sealing material.

13. A pump according to claim 12, wherein the open expansion grooves are in the form of a spiral so that a pumping action is created by the relative rotation between the impeller and the annular seal to resist leakage of liquid being pumped through said expansion grooves.

14. A pump according to claim 13, wherein the segments of sealing material are arranged in staggered sets to form staggered open expansion grooves therebetween.

15. A pump according to claim 12, wherein said second surface of the housing is defined by a radially inwardly extending portion of a mating ring of said housing.

16. A method of compensating for a difference in thermal expansion between a rotary member adapted to rotated about an axis of rotation and the adjacent sealing material of a floating annular seal which encircles said rotary member with clearance and forms a fluid seal with a radially opposed surface of the rotary member, comprising the steps of providing the sealing material in a discontinuous, annular form having at least one open expansion groove formed therein, and mounting the sealing material on a backing ring of a material whose thermal expansion is closer to that of said rotary member than that of said sealing material via an intermediate elastomeric material and wherein said sealing material is provided in the form of a plurality of segments which are mounted end to end with clearance on said backing ring via said intermediate elastomeric material to form open expansion grooves between the ends of the segments.

17. A method according to claim 19, wherein said open expansion grooves are in the form of a spiral for creating a pumping action to resist fluid leakage through said grooves with relative rotation of said rotary member and said annular seal.

18. An annular seal for forming a seal with a radially opposed first surface, comprising, in combination, a sealing material adapted to be positioned radially opposite a first surface to be sealed, a backing ring radially spaced from said sealing material, and elastomeric means interconnecting said sealing material and said backing ring wherein said annular seal is a floating seal with the backing ring thereof having an end surface adapted to form an axial face seal with an axially opposed second surface, and wherein said end surface of the backing ring is formed on an axially projecting nose of said backing ring.

19. An apparatus comprising a first rotating member which is rotatable about an axis, a second stationary member surrounding at least a portion of the first member with clearance and a floating annular seal located intermediate the first and second members for sealing against both a first surface of the first member and a second surface of the second member, said floating annular sealing including a sealing material positioned with clearance radially opposite said first surface of the first member for forming a seal therewith, a backing ring located radially outward from the sealing material, said backing material having an end surface for forming an axial face sealing with said second surface of the second member which is axially opposed to said end surface of the backing ring and an intermediate material arranged between the sealing material and the backing ring and interconnecting the sealing material and the backing ring, and wherein the sealing material comprises a plurality of segments of sealing material having opposed edges which define open expansion grooves therebetween for eliminating hoop stress in the sealing material.

* * * * *